3,746,565
POLYAMIDE ARTICLES OF REDUCED VAPOR PERMEABILITY

Johannes Schneider and Wolfgang Pungs, Troisdorf, Germany, assignors to Dynamit Nobel AG, Postfach, Germany
No Drawing. Filed Nov. 2, 1970, Ser. No. 86,332
Claims priority, application Germany, Oct. 31, 1969, P 19 54 831.3
Int. Cl. B32b *27/08*
U.S. Cl. 117—94       4 Claims

ABSTRACT OF THE DISCLOSURE

Shaped articles of amorphous polyamides have their gas and water vapor permeability reduced by immersion in a 45–80:55–20 water-copolymer dispersion, the copolymer comprising 85–90:15–10 vinylidene chloride: ethyl acrylate, all by weight, followed by drying in warm air. The amorphous polyamide preferably comprises radicals of terephthalic acid, isophthalic acid or mixtures thereof and radicals of 2,2,4-trimethylhexamethylenediamine, 2,4,4-trimethylhexamethylenediamine, hexamethylenediamine, nonamethylenediamine or mixtures thereof; the shaped article may also comprise up to about 40% by weight of a partially crystallizable polyamide.

---

Amorphous polyamides prepared from terephthalic acid and 2,2,4-trimethylhexamethylenediamine, 2,4,4-trimethylhexamethylenediamine or mixtures thereof are described in U.S. Pat. 3,150,117. According to U.S. Pat. 3,294,758, as much as 30 wt. percent of the aforementioned diamine mixture can be replaced by hexamethylenediamine without substantially altering the characteristics of the polyamide. It is furthermore known that such polyamides can be prepared from the dimethyl ester of terephthalic acid and the above-named diamines or diamine mixtures according to British Pat. 1,049,987. Amorphous and transparent polycondensates can be prepared from isophthalic acid/terephthalic acid or from their diaryl or dialkyl esters and hexamethylenediamine or nonamethylenediamine according to British Pats. 1,019,707 and 1,021,608, respectively.

One of the most common applications of these transparent polyamides is their formation into hollow bodies and sheets which are used in the packaging industry and allied fields. To broaden the usefulness of such hollow bodies and sheets it is desirable that they be highly transparent, that they be heat-sealable, and that they maintain their stiffness of shape and remain free from distortion when exposed moisture and heat. Furthermore, they must meet the requirements of industrial practice as regards resistance to breakage and, in many cases, to the goods to be packed in them, such as oils, fats, waxes or the like. It has been found, of course, that the above-mentioned requirements are fulfilled when the described polyamides are used in the form of hollow bodies or sheet materials, but there is a disadvantage in the high water vapor and gas permeability of such products, so that they cannot be used where low permeability is required, especially low permeability to moisture.

It is accordingly an abject of the present invention to reduce the gas and water vapor permeability of transparent articles such as sheets and hollow bodies of amorphous polyamides.

This and other objects are realized in accordance with the present invention wherein shaped transparent bodies of amorphous polyamides, after an optional degreasing step, are immersed in a dispersion of about 55 to 20 parts by weight of a copolymer of about 85 to 90 parts by weight of vinylidene chloride and about 15 to 10 parts of ethyl acrylate, in about 45 to 80 weight parts of water, and are dried in a current of heated air.

The amorphous polyamides are advantageously derived, as regards the acid radicals, from aromatic dicarboxylic acids such as terephthalic acid, isophthalic acid, or mixtures thereof, and, as regards the diamine radicals, from aliphatic diamines such as 2,2,4-trimethylhexamethylenediamine, 2,4,4-trimethylhexamethylenediamine, hexamethylenediamine, nonamethylenediamine, or mixtures of these diamines.

Degreasing prior to coating is desirable if the materials have been touched by human hands or if their surface is slightly contaminated with oil or grease from the mold. Chloroform, carbon tetrachloride, methyl chloroform, trichloroethylene, perchloroethylene or the like are examples of degreasing agents. The materials are passed through a bath of this sort and then dried.

The dispersions of the above-mentioned copolymers are prepared therefrom in a known manner by means of cationically active, anionically active or non-ionic emulsifying agents, or the dispersions produced by emulsion polymerization are used. The heated air used for the final drying may have a temperature between about 60 and 120° C.

Coatings can be applied to formed bodies made from granular polyamides prepared from terephthalic acid and 2,2,4/2,4,4-trimethylhexamethylenediamine, the diamine mixture being replaceable by up to about 30 wt. percent of hexamethyelendiamine. Preferentially suited for this purpose are starting condensation products whose viscosity numbers range from about 92 to 125, working temperatures of about 170 to 190° C. being required. Also usable are formed bodies made from isophthalic acid/terephthalic acid or their diphenyl esters and hexamethylenediamine or nonamethylenediamine, if the polycondensates have viscosity numbers from about 130 to 160. The viscosity numbers were determined according to DIN 53,727 in a 0.5 weight-percent solution in m-cresol at 25° C. Polyamides of terephthalic acid dimethyl ester and 2,2,4- and/or 2,4,4-trimethylhexamethylenediamine are usable in the same viscosity range.

Materials coated in this manner can be heated to 120° C. for 6 hours or 24 hours for sterilization purposes, for examples, without the appearance of distortion phenomena, deformation, or impairment of transparency.

It has furthermore been found that sheets and hollow bodies of the above-mentioned amorphous polyamides prepared from the dimethyl ester of terephthalic acid and a mixture of 2,2,4- and 2,4,4-trimethylhexamethylene diamine and compounded with partially crystallizable polyamides are especially suited for coating in this manner. Surprisingly, it has also been found that when the polyamides contain about 1 to 40% by weight of a partially crystallizable polyamide prepared from ε-aminocaprolactam, adipic acid/hexamethylenediamine, sebacic acid/hexamethylenediamine, ω-aminoundecanoic acid and lauric lactam, clearly transparent materials are produced by the coating process. With a content of 1 or 2 to 10% by weight of a partially crystallizable polyamide, the coated hollow bodies show no deformation after 6 hours of exposure to a normal atmosphere at 120° C. But if the content of the partially crystallizable polyamide is increased to 40% by weight, impairment of transparency and distortion phenomena appear under the same conditions of exposure.

The products of the invention are resistant to dilute alkalies and acids, fuels, oils and fats, and are less permeable to water vapor, nitrogen, oxygen, carbon dioxide and air than hollow bodies of the same kind which have not been treated.

While the coating may be quite thick, little advantage is gained since a coating of about 20 microns or even less is sufficient to reduce the permeability markedly while leaving the article transparent.

The invention is illustrated in the following example.

EXAMPLE

A polyamide of terephthalic acid dimethyl ester and a 50–50 mixture of 2,2,4- and 2,4,4-trimethylhexamethylenediamine, having a viscosity of 140 and a melting range of 190 to 230 C., was made into hollow bodies of 420 cm.$^3$ capacity in a blow-molding machine (Bekum E 50) under the following conditions:

Cylinder temperature:
    1=Entry—205° C.
    2nd zone—225° C.
    3rd zone—235° C.
    4th zone—225° C.
    Tool [die]—210° C.
    Blowing time—7 sec.
    Amperage—6.6

The hollow bodies thus made were carried by a perforated container through a bath of carbon tetrachloride, exposed for 3 to 5 minutes to an air current of about 95° C., and then immersed into an aqueous dispersion consisting of a 45% by weight emulsion of a copolymer of 85% by weight vinylidene chloride and 15% by weight ethyl acrylate (Emulsifier 2% by weight sodium lauryl sulfate). After an immersion time of about 30 seconds the hollow bodies were taken from the bath. The dipped articles had a cloudy-white appearance and the coated surface had a sticky consistency. Treatment in a current of air at about 70° C. produced a pore-free and clearly transparent coating of about 20 microns thickness firmly adhering to the surface. The permeation coefficients determined on these coated bodies according to DIN 53,536 in comparison with untreated specimens are listed herewith.

Permeation coefficient: 10$^{-12}$ g./cm. torr h.
Specimen thickness: 0.2 mm.

|  | Uncoated specimen | Coated specimen |
|---|---|---|
| Nitrogen | 1–2 | 0.15 |
| Oxygen | 2 | 0.45 |
| Carbon dioxide | 2–3 | 2 |
| Air | 1–2 | 0.15 |
| Water vapor | 6,000 | 2,500 |

Similar good results were obtained with materials made from other amorphous polyamides named in the above description, after the coating was applied, especially when the article also comprises about 10% of polycaprolactam or nylon-66.

The following can be added to the polyamides and/or the dispersions as light stabilizers, in quantities such as to constitute 0.1 to 3% by weight of the finished articles:
2-hydroxy-4-n-octoxybenzophenone,
2,2'-dihydroxy-4-methoxybenzophenone,
2-(2-hydroxy-3,5-di-tertiary butyl-phenyl)-benzotriazole,
2-cyan-3-(4-methoxyphenyl)-crotonic acid methyl ester, or the like.

It will be appreciated that the instant specification and examples are set forth by way of illustration and not limitation and that various modifications and changes may be made without departing from the spirit and scope of the present invention.

What is claimed is:

1. A transparent shaped article of reduced gas and water vapor permeability comprising an amorphous polyamide and up to about 40% by weight of a partially crystallizable polyamide carrying a coating comprising a copolymer comprising about 85 to 90 parts by weight of vinylidene chloride and about 15 to 10 parts by weight of ethyl acrylate.

2. An article according to claim 1, wherein said polyamide comprises radicals of an aromatic dicarboxylic acid and of an aliphatic diamine.

3. An article according to claim 1, wherein said article comprises a hollow body.

4. An article according to claim 2, wherein said amorphous polyamide comprises radicals of terephthalic acid, isophthalic acid or mixtures thereof and radicals of 2,2,4-trimethylhexamethylenediamine, 2,4,4 - trimethylhexamethylenediamine, hexamethylenediamine, nonamethylenediamine or mixtures thereof, and said partially crystallizable polyamide comprises about 1 to 10% by weight of said article.

References Cited

UNITED STATES PATENTS

| 2,748,027 | 5/1956 | Meiser | 117—161 X |
| 3,150,117 | 9/1964 | Gabler | 260—33.4 X |
| 3,294,758 | 12/1966 | Gabler | 260—30.8 X |
| 2,910,385 | 10/1959 | Berry et al. | 117—161 X |
| 3,108,017 | 10/1963 | Messwarb et al. | 117—161 X |
| 3,428,483 | 2/1969 | Owens | 117—161 |

WILLIAM D. MARTIN, Primary Examiner

S. L. CHILDS, Assistant Examiner

U.S. Cl. X.R.

117—47 A, 138.8 N, 161 UC